United States Patent
Hjerpe et al.

(10) Patent No.: US 7,938,439 B2
(45) Date of Patent: May 10, 2011

(54) SAFETY DEVICE FOR THE PROTECTION OF VEHICLE OCCUPANTS

(75) Inventors: Erik Hjerpe, Torslanda (SE); Dan Bråse, Vargarda (SE)

(73) Assignee: Autoliv Development AB, Vargarda (SE)

( * ) Notice: Subject to any disclaimer, the term of this patent is extended or adjusted under 35 U.S.C. 154(b) by 146 days.

(21) Appl. No.: 12/262,489

(22) Filed: Oct. 31, 2008

(65) Prior Publication Data
US 2009/0115170 A1    May 7, 2009

(30) Foreign Application Priority Data
Nov. 7, 2007  (DE) .......................... 10 2007 052 875

(51) Int. Cl.
*B60G 21/16* (2006.01)
(52) U.S. Cl. .................................................. 280/730.2
(58) Field of Classification Search .............. 280/730.2, 280/728.2, 734
See application file for complete search history.

(56) References Cited

U.S. PATENT DOCUMENTS

| | | | | |
|---|---|---|---|---|
| 1,936,251 | A * | 11/1933 | McCullough | 280/749 |
| 4,421,342 | A * | 12/1983 | Brown, Jr. | 280/740 |
| 5,599,042 | A * | 2/1997 | Shyr et al. | 280/730.1 |
| 6,237,943 | B1 * | 5/2001 | Brown et al. | 280/730.2 |
| 6,308,982 | B1 * | 10/2001 | Wallner et al. | 280/730.2 |
| 6,474,681 | B2 * | 11/2002 | Peer et al. | 280/730.2 |
| 6,733,035 | B2 * | 5/2004 | Thomas et al. | 280/730.2 |
| 6,824,164 | B2 * | 11/2004 | Pywell | 280/730.2 |
| 7,000,944 | B2 * | 2/2006 | Bakhsh et al. | 280/730.1 |
| 7,513,522 | B2 * | 4/2009 | Tanaka et al. | 280/730.2 |
| 2002/0175502 | A1 * | 11/2002 | Tesch et al. | 280/730.2 |
| 2005/0189744 | A1 * | 9/2005 | Hsu et al. | 280/730.2 |
| 2010/0066065 | A1 * | 3/2010 | Takahashi et al. | 280/728.3 |

* cited by examiner

*Primary Examiner* — Faye M. Fleming
(74) *Attorney, Agent, or Firm* — Brinks Hofer Gilson & Lione

(57) ABSTRACT

A safety device for protection of vehicle occupants is described. The safety device exhibits a curtain airbag (10) located in the area of the roof frame, with an upper edge (10*a*), which is rolled up in quiescent state and unrolled in the case of an accident. The curtain airbag can be filled with gas. In order to enable the safety device to be used reversibly, the curtain airbag (10) is rolled up to roll around its upper edge (10*a*) when in quiescent state, and the upper edge is held by fixing elements in a manner which the airbag is rotatable.

7 Claims, 5 Drawing Sheets

SAFETY DEVICE FOR THE PROTECTION OF VEHICLE OCCUPANTS

CROSS REFERENCE TO RELATED APPLICATION

This application claims priority to German patent application number 10 2007 052 875.4, filed Nov. 7, 2007.

FIELD OF THE INVENTION

The invention relates to an inflatable restraint type safety device for the protection of vehicle occupants.

BACKGROUND OF THE INVENTION

So-called curtain airbags are known in vehicle engineering and are widely used. Such a curtain airbag forms an upper and lower edge, and the upper edge is connected to the internal vehicle structure along the side of the interior in the area of the roof rail. When in an undepolyed state, the curtain airbag is folded or rolled around its lower edge. If an accident occurs, namely if there is a side collision or the vehicle rolls over, the curtain airbag is filled with gas and unfolds in front of at least one side window of the vehicle. Following the accident, the curtain airbag has to be removed in a repair facility and has to be replaced by a new one. This naturally gives rise to considerable cost. These devices are irreversibly deployed and are not reused once activated.

A further disadvantage of curtain airbags of the type known is as follows: vehicle safety systems are known which do not only activate safety equipment such as airbags, belt tensioners and similar when the vehicle strikes an obstacle, but may be deployed beforehand, with proximity sensors being provided for this purpose. In particular in the case of side collisions, such systems offer advantages, as in contrast to frontal crashes, there is practically no crumple zone to absorb impact. Because of the above, however, curtain airbags may only be triggered as a result of such proximity sensors if the associated electronic system interprets the incoming signals so as to establish that a side impact will certainly occur.

However, with regard to ideal protection of the vehicle occupants, it would be desirable if curtain airbags could also be activated in a preventative sense, in other words at a relatively early stage of a possible accident, even if there is still the chance that no actual side impact or rollover will occur.

The present invention therefore sets itself the task of creating a safety device which can already be activated at an early point in time, even if it is not yet certain that an accident will occur.

SUMMARY OF THE INVENTION

The safety device in accordance with the invention for the protection of the vehicle occupants can work reversibly. This is achieved in that the curtain airbag is rolled up into a roll around its upper edge when in quiescent or uninflated state, and that at least the ends of the upper edge are held to fixing elements in rotatable fashion. Therefore, when in the quiescent state, the curtain airbag is rolled up like a roller blind and can easily be rolled back up or retracted into this state after use. Return elements, for example in the form of constant force springs, are preferably present for this purpose.

It is also advantageous if the curtain airbag when in quiescent state is rolled up onto a shaft, which is fastened to the vehicle structure in a rotatable fashion. This means that the curtain airbag can be rolled up again particularly easily after unfolding. This in turn means that the trigger threshold for the curtain airbag can be lowered, so that the airbag may also be triggered unnecessarily, i.e. in cases where an accident does not subsequently occur. In such a case, following the re-rolling of the curtain airbag, the deployment process can be repeated without the need to visit a garage or workshop. Thus the curtain airbag in accordance with this invention is deployable in a reversible manner.

In the case of curtain airbags as they have been known up to now, the gas generator which fills the curtain airbag or a gas lance which is connected with the gas generator is located in the area of the upper edge of the curtain airbag and the unfolding and expansion of the curtain airbag is achieved by means of the developing gas pressure when gas streams into the curtain airbag in this upper area. In the case of the safety device according to the present invention, further measures are taken for deployment. Therefore preferably means are present which interact with the lower area of the curtain airbag in case of an accident, in order to unroll the curtain airbag. Alternatively or in addition to this, it is possible to fill the curtain airbag from below, for which purpose a lower section of the curtain airbag is connected with a pressure source by means of a hose or gas duct.

Because of the reversibility, it is possible to unfold the curtain airbag in accordance with this invention at an early point in time when a possible impact is detected, the unfolding needs not necessarily occur as rapidly as has been the case with previous curtain airbags. It is therefore also possible not to make use of a pyrotechnical type of gas generator, but, for example, to make use of a compressed air system, which is particularly possible in the case of trucks and lorries which have such a system for other purposes.

BRIEF DESCRIPTION OF THE DRAWINGS

Further preferred embodiments result from the subclaims and also from the embodiments which will now be described in more detail with reference to the drawings. The drawings show:

FIG. 7 is a cross-section along Line C-C from FIG. 6.

DETAILED DESCRIPTION OF THE INVENTION

Figure 1:
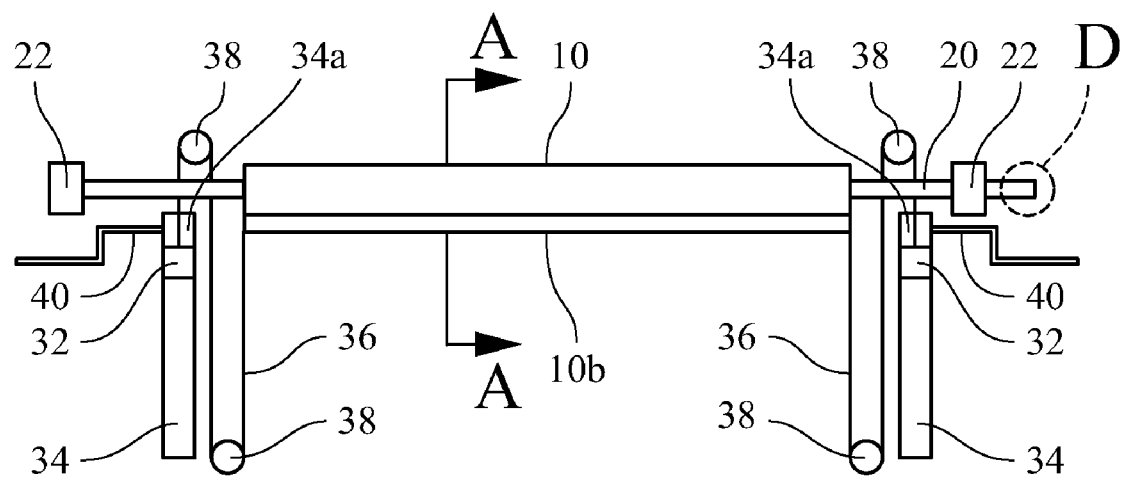
FIG. 1 is a schematic representation of a safety device in quiescent state in accordance with a first embodiment of the present invention.
Figure 2:
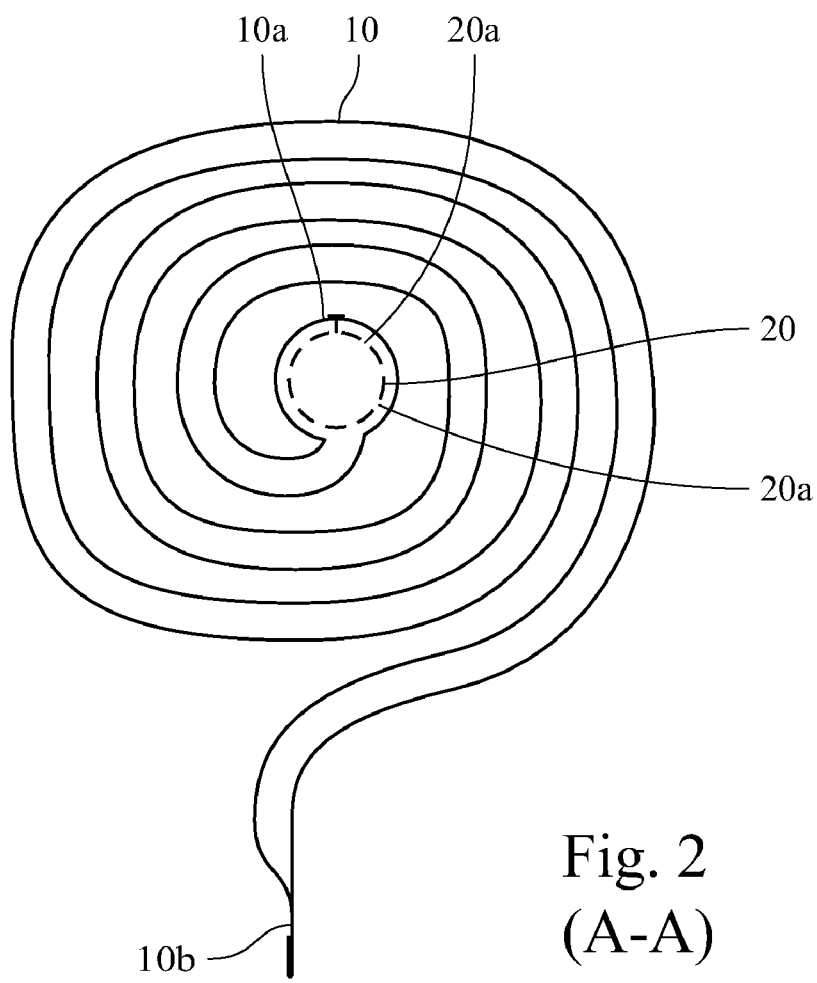
FIG. 2 is a cross-section along line A-A from FIG. 1.
Figure 3:
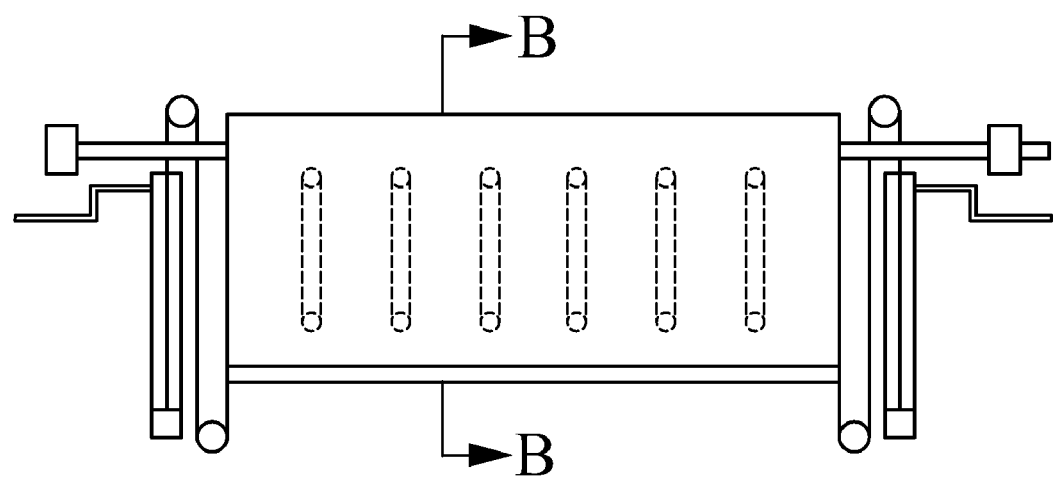
FIG. 3 shows the system in FIG. 1 following activation of the safety device.
Figure 4:
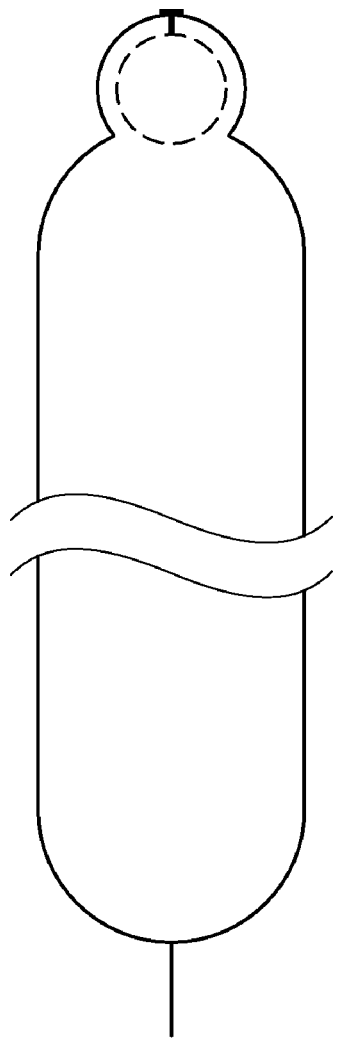
FIG. 4 is a cross-section along Line B-B from FIG. 3.

FIGS. 1 and 2 show a first embodiment of a safety device in accordance with this invention in a quiescent or undeployed state, whereby FIG. 2 is a cross-section along Line A-A from FIG. 1. The safety device is in the form of a curtain airbag 10, which is wound round a hollow shaft 20. Curtain airbag 10 is basically rectangular with an upper edge 10a, which extends from a first end to a second end. Hollow shaft 20 is fixed in rotatable fashion to the inner structure of a motor vehicle by means of bearings 22, namely in the area of the roof rail. This means that also the upper edge 10a is held in rotatable fashion in relation to bearings 22 serving as fixing elements. At least one constant force spring is present (not shown) which acts on hollow shaft 20 in such a way that in the absence of further forces, it urges the airbag 10 to move to or remain in the rolled-up state shown in FIGS. 1 and 2.

Figure 1A:
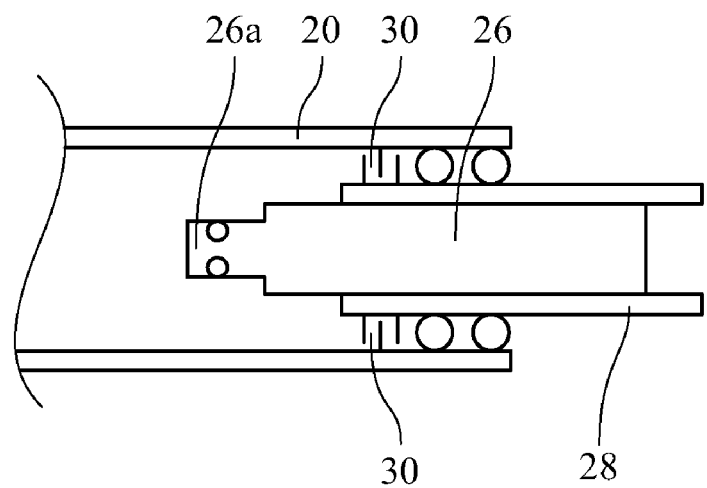
FIG. 1a is an enlarged cut-away section of section D1 from FIG. 1.

As can be seen, for example, in FIG. 2, hollow shaft 20 extends along the upper edge 10a of curtain airbag 10 and is also connected with curtain airbag 10 in this area. At one end of the hollow shaft 20, as can be seen in FIG. 1a, the outflow area 26a of a gas generator 26 projects into the interior of hollow shaft 20. This gas generator 26 is mounted in a holder 28 so as to be non-rotatable, and holder 28 is sealed against hollow shaft 20 by means of a seal, whereby hollow shaft 20 can be rotated around holder 28. As an alternative to gas generator 26, an outlet valve connected with a compressed air system could also be provided. If gas generator 26 is ignited, gas streams away from it through hollow shaft 20 and through openings 20a in the walls of the hollow shaft into the interior of curtain airbag 10. Because curtain airbag 10 is wound onto hollow shaft 20 around its upper edge 10a, however, the fact that the gas streams in does not lead to unfolding, i.e. to unrolling of curtain airbag 10, without further measures.

Figure 5:
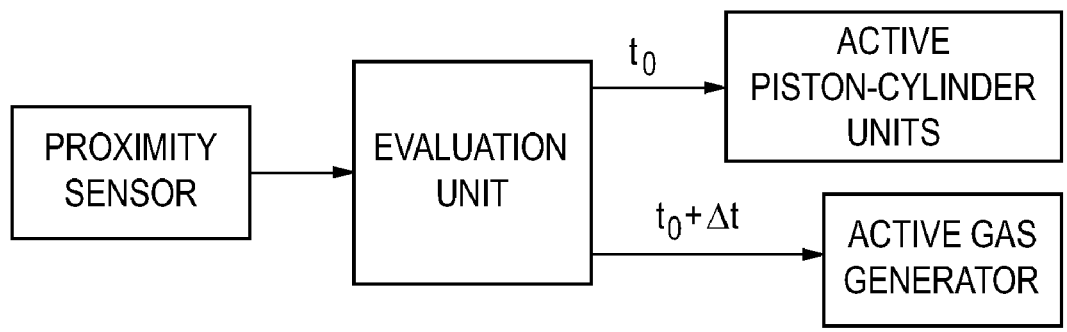
FIG. 5 shows a control scheme for the safety device of the first embodiment.
Figure 6:
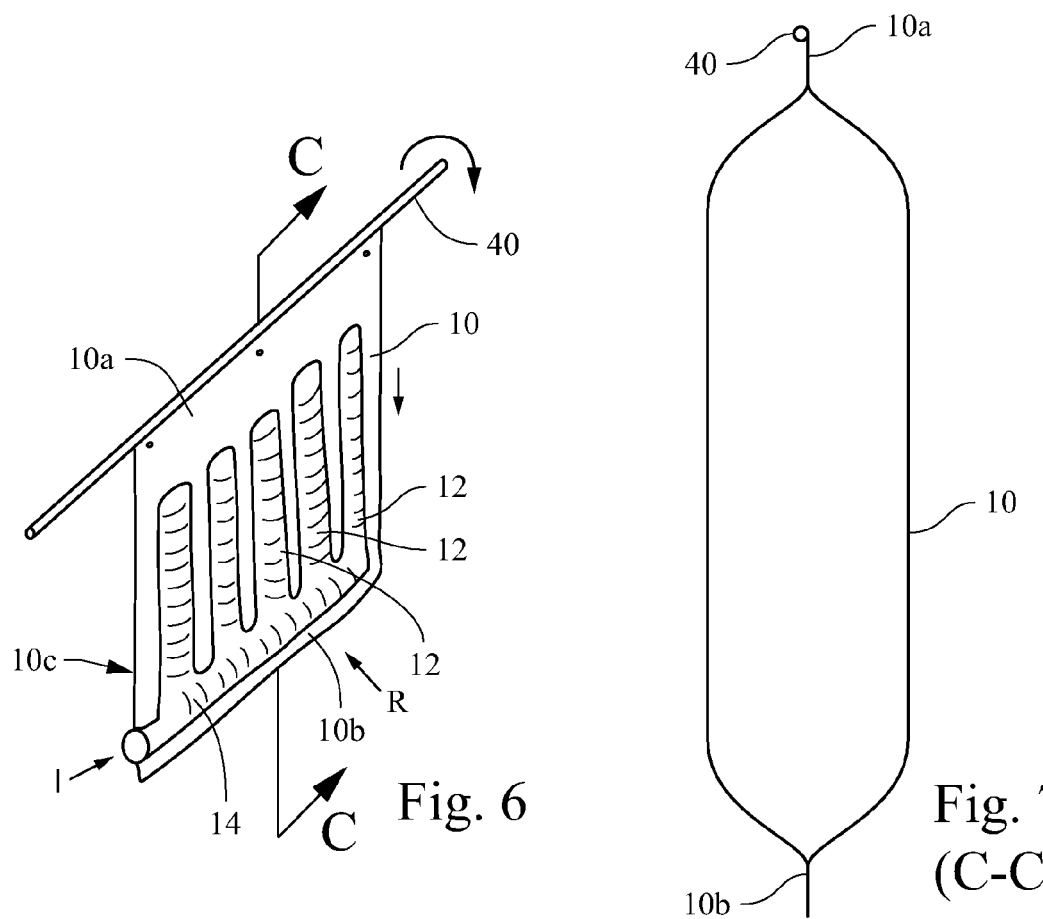
FIG. 6 is a schematic perspective view of a second embodiment of the invention in activated state.

In view of the foregoing, means are provided which actively unroll curtain airbag 10 in case of actuation. These means, in the first embodiment shown here, includes two pistons 32, which are held in cylinders 34. These pistons 32 are each connected with the lower edge 10b of curtain airbag 10 by means of a pull cable 36 being guided by two reversing rollers 38. Compressed gas connections 40 are present, through which gas can stream into the respective working chamber 34 of cylinder 34 and therefore can drive the respective piston, which means that lower edge 10b of curtain airbag 10 is pulled downwards by means of pull cables 36, therefore unrolling the curtain airbag 10. Preferably curtain airbag 10 is first completely unrolled before curtain airbag 10 is filled with gas, as is shown in the control scheme in FIG. 5.

The signals of a proximity sensor are led to an evaluation unit. This evaluation unit processes incoming signals—possibly together with further signals—and evaluates if an accident is probable. If the probability lies above a certain threshold value, first the piston-cylinder-units are activated and then, with a certain time delay, which is sufficient to unroll the curtain airbag, the gas generator 26 is ignited, so that the curtain airbag 10 is filled with gas and therefore deploys to develop its full protective effect.

FIGS. 6 to 10 show a second embodiment of the invention. Here too, the curtain airbag 10 is rolled round its upper edge 10a on a shaft 40; however, in this case shaft 40 is not hollow. As also in the first embodiment, upper edge 10a of curtain airbag 10 is connected with this shaft 40 so as to be incapable of rotation, and shaft 40 is held in rotatable fashion on the inner structure of the vehicle by means of bearings (not shown).

Figure 8:
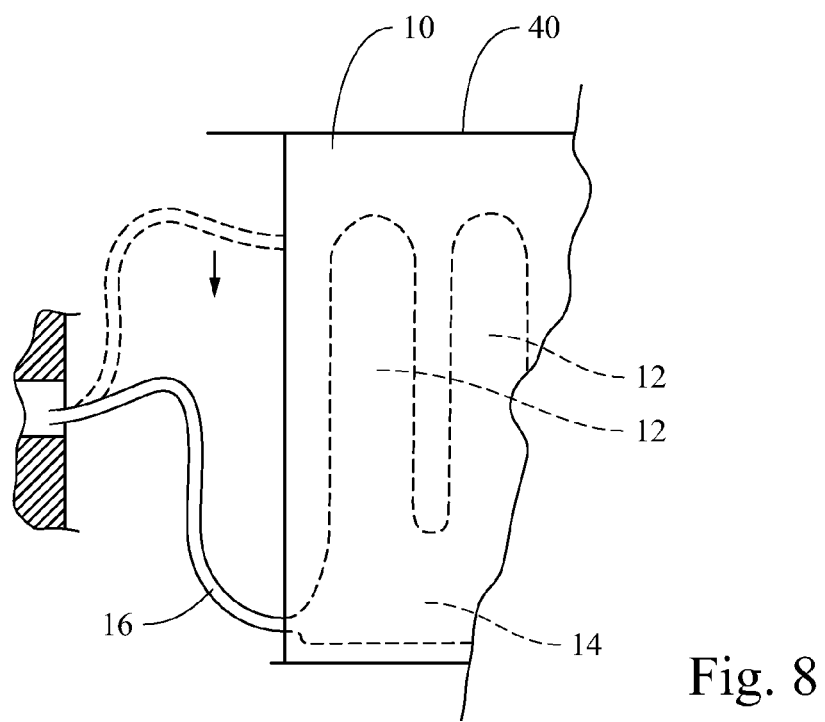
FIG. 8 is a plan view of the items shown in FIG. 6 from Direction R, whereby a filling hose is shown in two positions.

In contrast to the first embodiment, the curtain airbag of the second embodiment is not filled with gas from above, but from below. For this purpose, curtain airbag 10 forms a horizontally-running chamber 14 and several vertically-running chambers 12 extending upwards from the horizontally-running chamber 14. Horizontally-running chamber 14 extends up to a side edge 10c of curtain airbag 10, where it opens into a filling hose 16 (only shown in FIG. 8). Filling hose 16 runs completely outside curtain airbag 10 and is connected with a pressure source, as indicated in FIG. 8 in schematic form. The position of filling hose 16 in the rolled-up curtain airbag 10 (broken line) and in the fully-unrolled curtain airbag (solid line) are also shown in FIG. 8.

Figure 9:
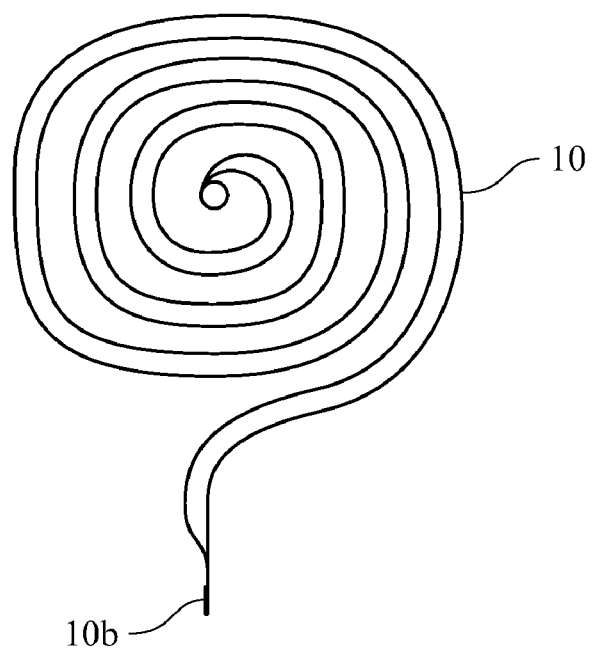
FIG. 9 is a cross-section through the curtain airbag from FIG. 6 in rolled-up state.
Figure 10:
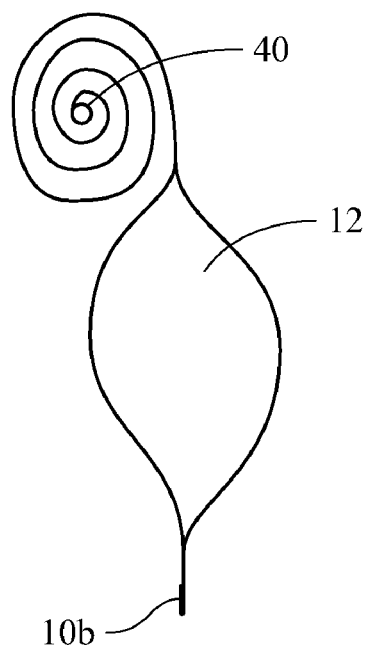
FIG. 10 shows the curtain airbag from FIG. 9 at an early stage of expansion.

FIG. 9 shows a cross-section through rolled-up curtain airbag 10. FIG. 10 shows the items of FIG. 9 at an early unrolled and expansion stage of curtain airbag 10. In contrast to the first embodiment, the unrolling and the filling occur simultaneously, whereby depending on the concrete form of the safety device, the pressure building up in vertically-running chambers 12 may be sufficient in order to unroll the airbag. However, additional means may also be present which support the unrolling such as that described in connection with the first embodiment.

FIG. 7 shows the curtain airbag 10 in fully-unrolled and filled condition in a view corresponding to FIG. 9.

In the second embodiment it would also be possible not to provide a continuous shaft 40, but only to fix both ends of the upper edge 10 to the inner vehicle structure so as to be capable of rotation. However, it can be expected that a more even rolling up behaviour is possible in the presence of a continuous shaft.

The invention was basically described above in relation to passenger vehicles. However, a further possible application of the safety device according to the invention would be drivers' cabins of trucks. Here, a corresponding safety device can in particular serve to protect the driver or the passenger if the driver's cab should tip over, by unrolling and inflating the curtain airbag 10 in front of the corresponding side window. In this case, the trigger signal is generated from an inclination or tilt sensor, not by a proximity or impact sensor. As the driver's cabin of a truck tips over relatively slowly, the problem that unrolling and inflation takes longer in the case of the safety device in accordance with the invention than with a traditional curtain airbag is without significance. Because of the reversibility of the safety device, it is in particular also possible to unroll and fill the curtain airbag on quite slight tilting of the driver's cabin, even if there is still a chance that the cabin will not tip over completely.

While the above description constitutes the preferred embodiment of the present invention, it will be appreciated that the invention is susceptible to modification, variation, and change without departing from the proper scope and fair meaning of the accompanying claims.

The invention claimed is:

1. A safety device for the protection of vehicle occupants, comprising a curtain airbag located in the area of the roof frame along the side of the vehicle interior, wherein the airbag is rolled up in an undeployed state and is unrolled in a deployed state in case of a potential accident and which can be filled with a gas, the curtain airbag forming an upper edge, and wherein the curtain airbag when in the undeployed state is rolled around the upper edge around a shaft into a roll and that fixing elements support the upper edge such that the airbag is rotatable between the undeployed state and the deployed state in which the airbag is unrolled, and unrolling means for acting on a lower edge of the curtain airbag in case of a potential accident for unrolling the airbag from the undeployed state to the deployed state and causing the shaft to rotate.

2. A safety device for the protection of vehicle occupants, comprising a curtain airbag located in the area of the roof frame along the side of the vehicle interior, wherein the airbag is rolled up in an undeployed state and is unrolled in a deployed state in case of a potential accident and which can be filled with a gas, the curtain airbag forming an upper edge, and wherein the curtain airbag when in the undeployed state is rolled around the upper edge into a roll and that fixing elements support the upper edge such that the airbag is rotatable between the undeployed state and the deployed state in which the airbag is unrolled, and unrolling means for acting on a lower edge of the curtain airbag in case of a potential accident for unrolling the airbag from the undeployed state to the deployed state, wherein return elements are present which can urge the curtain airbag from the deployed state wherein the airbag is unrolled into the undeployed state wherein the airbag is rolled up.

3. A safety device according to claim 1, wherein the curtain airbag is wound onto a shaft when in the undeployed state.

4. A safety device according to claim 3, wherein the shaft is a hollow shaft and the gas for filling the airbag flows through the hollow shaft.

5. A safety device according to claim 1, wherein the unrolling means is in the form of at least one piston-cylinder-unit which can be loaded with compressed air to urge the lower edge to move the airbag to the deployed state wherein the airbag is unrolled.

6. A safety device according to claim 1, wherein a lower section of the curtain airbag is connected with a pressure source of the gas by a filling hose to inflate the airbag with the gas.

7. A safety device according to claim 6, wherein the curtain airbag forms a horizontally-running chamber which is connected to the filling hose, and a plurality of vertically-running chambers which extend from the horizontally-running chamber for conducting the gas.

\* \* \* \* \*